Feb. 7, 1933.  E. A. ROCKWELL  1,896,378
OIL SEAL
Filed June 20, 1929
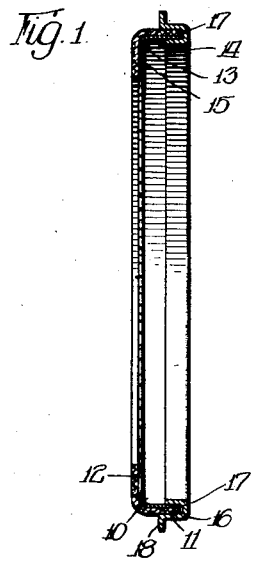
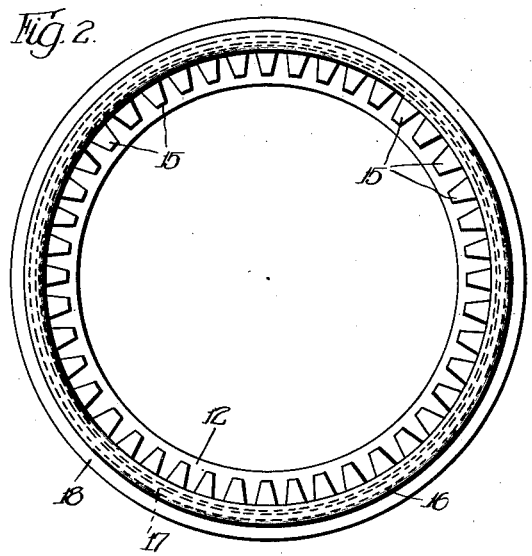
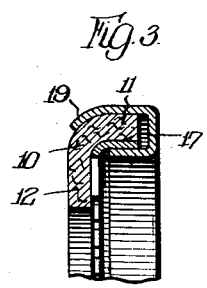
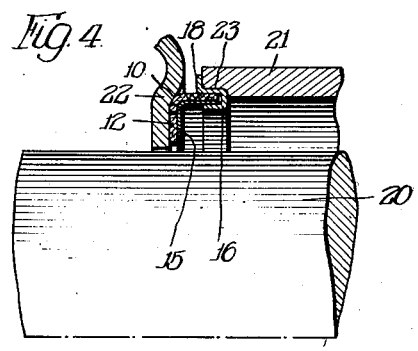
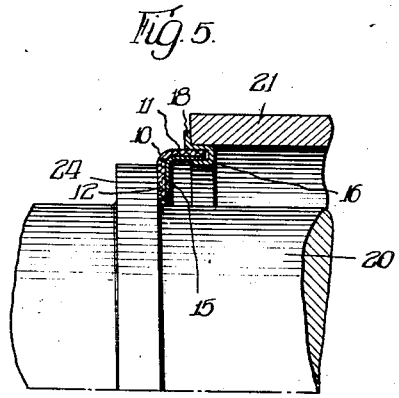
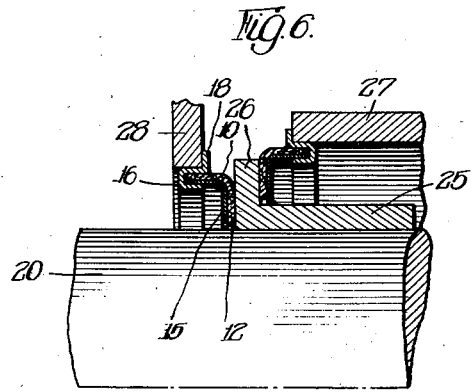
Inventor:
Edward A. Rockwell, Patented Feb. 7, 1933

1,896,378

UNITED STATES PATENT OFFICE

EDWARD A. ROCKWELL, OF CHICAGO, ILLINOIS

OIL SEAL

Application filed June 20, 1929. Serial No. 372,439.

This invention relates to improvements in oil seals, especially adapted to cooperate with a housing which encloses a rotatable shaft and to prevent the leakage of oil or other fluid from the housing.

My improvements are applicable to a type of oil seal which is fixedly mounted in a housing portion and includes a flanged packing member of yieldable material that is resiliently pressed into sealing engagement with a flange that is transverse to the axis of the shaft. The flanged portion may be integral with the shaft or fixedly secured thereto, or may extend from a member that is rotatable with respect to the shaft.

It is an object of the present invention to provide an effective oil seal that may be arranged as above specified and will take up only a small amount of space.

It is further an object of the invention to provide an oil seal consisting of a small number of parts that may be easily manufactured and readily assembled into a unitary construction.

Further and additional objects and advantages will be more readily apparent from the following detailed description taken in connection with the accompanying drawing, in which—

Figure 1 is a diametrical section through my improved oil seal unit;

Figure 2 is an end view of the oil seal shown in Figure 1;

Figure 3 is an enlarged fragmentary section illustrating a modified construction of an oil seal;

Figure 4 is a fragmentary section illustrating the oil seal shown in Figure 1 in assembled position;

Figure 5 is a view similar to Figure 4, but illustrating a modified arrangement; and Figure 6 is a fragmentary section illustrating a pair of oil seal units mounted in fixed housings and cooperating with a member rotatably mounted on a cylindrical shaft.

It will be obvious that an oil seal unit may be arranged in many different positions, dependent on the design of the parts which must be sealed, only a few arrangements being shown in the drawing.

It is customary to use a flanged leather packing which is suitably held in a cage and cooperates in sealing engagement with the cylindrical surface of a rotatable shaft extending from a lubricant housing. The flange of the leather packing, which is resiliently pressed into engagement with the shaft, must have a sufficiently large area of contact to make an efficient seal. When it is desirable to conserve space in an axial direction of the shaft, an oil seal with the packing flange pressing against the cylindrical surface of the shaft, is not preferable. On the other hand, if the packing presses axially against a lateral flange of the shaft, a material amount of space may be conserved. In this form the area of surface contact may be as large as necessary without increasing the axial dimension of the unit.

Figures 1 and 2 illustrate my improved oil seal, in which 10 is a packing member of leather or other suitable yieldable material. The packing 10 includes an annular flange 11, extending to an edge which is gripped, while a similar flange 12 inwardly extends in a plane transverse to the axis of the seal. The packing, therefore, has a right-angled section. On the inner side seats a ring 13, which comprises an annular flange 14 seating against the flange 11 of the packing, and inwardly projecting resilient teeth 15, which press against the sealing flange 12. As a means for securing the packing and the resilient member, I show a metal stamping 16. The stamping member 16 is formed with a channel-shaped circular portion 17, which is bent to grip the edges of the packing flange 11 and the metal flange 14. An extension from the channel 17 may be bent outwardly, as shown in Figures 1 and 2, in order to form a supporting and spacing rim 18, or may be bent slightly inwardly around the corner of the packing to form a bracing lip 19, as shown in Figure 3. Either construction may be used, dependent upon the manner of assembly into a housing.

In Figure 4 a portion of a cylindrical rotatable shaft is designated at 20. Spaced from the shaft is a housing portion 21, which may extend from a lubricant chamber for operating members connected to the shaft. The oil will tend to pass along the shaft from right to left. Adjacent to the end of the housing portion 21 is a flange portion 22 extending into proximity with the shaft. If it is desired to prevent leakage of oil between the members 21 and 22, the oil seal unit is assembled as shown. Either of the members 21 and 22 could be rotatable relative to the other member. The housing 21 may be recessed as at 23 to form a seat for the channel 17 of the retainer ring. The packing is pressed tightly against the flange 21 and forms an efficient seal.

In Figure 5 the shaft 20 is shown with an integral or fixedly positioned collar 24, against which the packing is pressed. In this form all leakage along the shaft is prevented.

In Figure 6 the shaft 20 has mounted thereon a rotatable sleeve 25 having a lateral flange 26. Parts of housing walls are indicated at 27 and 28, each of which serves to mount an oil seal having its packing in sealing engagement with a face of the flange 26.

The seal as described conserves space in an axial direction and may be readily manufactured and assembled, since it includes only three parts and may be positioned in a variety of ways. It is obvious that the shaft does not need to be concentric with the oil seal, as is necessary with many forms of seals.

I claim—

1. A unitary circular seal comprising a flexible packing including an annular flange and a radial sealing flange, a metal ring on the inner side of said annular flange of said packing, said metal ring including radially projecting resilient fingers adapted to engage and yieldably press against the back of said radial sealing flange of said packing and a retaining and supporting member including a channel shaped gripping portion adapted to receive and engage circular marginal edges of said packing and said metal ring.

2. A unitary circular seal comprising a flexible packing including an annular flange and a radially disposed sealing flange in a plane transverse to the axis of the circular seal, an inner metal strengthening ring adapted to engage and support the inner side of said annular flange of said packing and the inner side of said radial sealing flange of said packing and a retaining and supporting member including a channel shaped gripping portion adapted to receive said packing and said metal ring, said retaining member including an outwardly and radially directed spacing rim adapted to serve as a stop in placing the unitary seal in a position for use.

3. A unitary circular seal comprising a flanged flexible packing, a strengthening metal member, and a retainer member including a channel shaped gripping portion for holding said packing and metal member, said retainer member including a radially and outwardly directed flange adapted to act as a stop in placing the completed seal in position for use.

4. In a unitary seal, a circular flexible packing including a radially extending sealing flange and a marginal annular flange, a retainer ring including an annular channel shaped gripping portion adapted to receive and secure the edge of said annular flange of said packing and a pressure ring also secured by said channel shaped portion, said pressure ring including yieldable portions adapted to engage the inner side of said sealing flange of said packing to press said sealing flange into engagement with a relatively movable surface to be sealed.

5. A unitary circular seal comprising a retainer ring including a channel shaped gripping portion facing in an axial direction with respect to the unitary seal and an outwardly and radially directed flange adapted to form a stop when the unitary seal is placed in a position of use, a flexible ring-shaped packing including an annular flange adapted to fit into said channel shaped gripping portion, and an inwardly and radially extending sealing flange and a ring-shaped member conforming to the shape of said packing and including an annular flange fitting into said channel shaped gripping portion and inwardly and radially extending resilient fingers engaging the back of said radial sealing flange of said packing.

Signed at Chicago, Illinois, this 12th day of June, 1929.

EDWARD A. ROCKWELL.